(12) United States Patent
Gholami et al.

(10) Patent No.: US 6,725,301 B1
(45) Date of Patent: Apr. 20, 2004

(54) SYSTEM SOLUTION TO ALLOW 64-BIT PCI ADAPTERS TO DETERMINE STATE DURING RESET

(75) Inventors: Ghadir Robert Gholami, Austin, TX (US); Mark David McLaughlin, Austin, TX (US); John Daniel Upton, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 09/606,640

(22) Filed: Jun. 29, 2000

(51) Int. Cl.[7] .............................................. G06F 13/14
(52) U.S. Cl. .................... 710/62; 710/102; 710/103; 710/128
(58) Field of Search ..................... 710/62, 102, 103, 710/128

(56) References Cited

U.S. PATENT DOCUMENTS 5,948,090 A * 9/1999 Heinrich et al. ............ 710/128
6,128,682 A * 10/2000 Humpherys et al. ........ 710/102
6,189,058 B1 * 2/2001 Jones, III et al. ........... 710/103

* cited by examiner

Primary Examiner—Abdelmoniem Elamin
(74) Attorney, Agent, or Firm—Duke W. Yee; Mark E. McBurney; Stephen R. Tkacs

(57) ABSTRACT

A modified system causes the REQ64# signal to be asserted when the adapter is in reset on a 64-bit slot. This allows the adapter to see that it is in a 64-bit slot at the beginning of reset, preventing the adapter from driving the 64-bit extension pins. The above-described modification must be made to all the 64-bit slots on a system. When the reset signal is active, it will cause the buffer to drive the REQ64# signal low. This will synchronize reset and REQ64#, eliminating the possibility for bus contention. No modification is necessary for 32-bit slots. This modification will not affect the normal operation of the bus, since it is only used during reset.

15 Claims, 2 Drawing Sheets

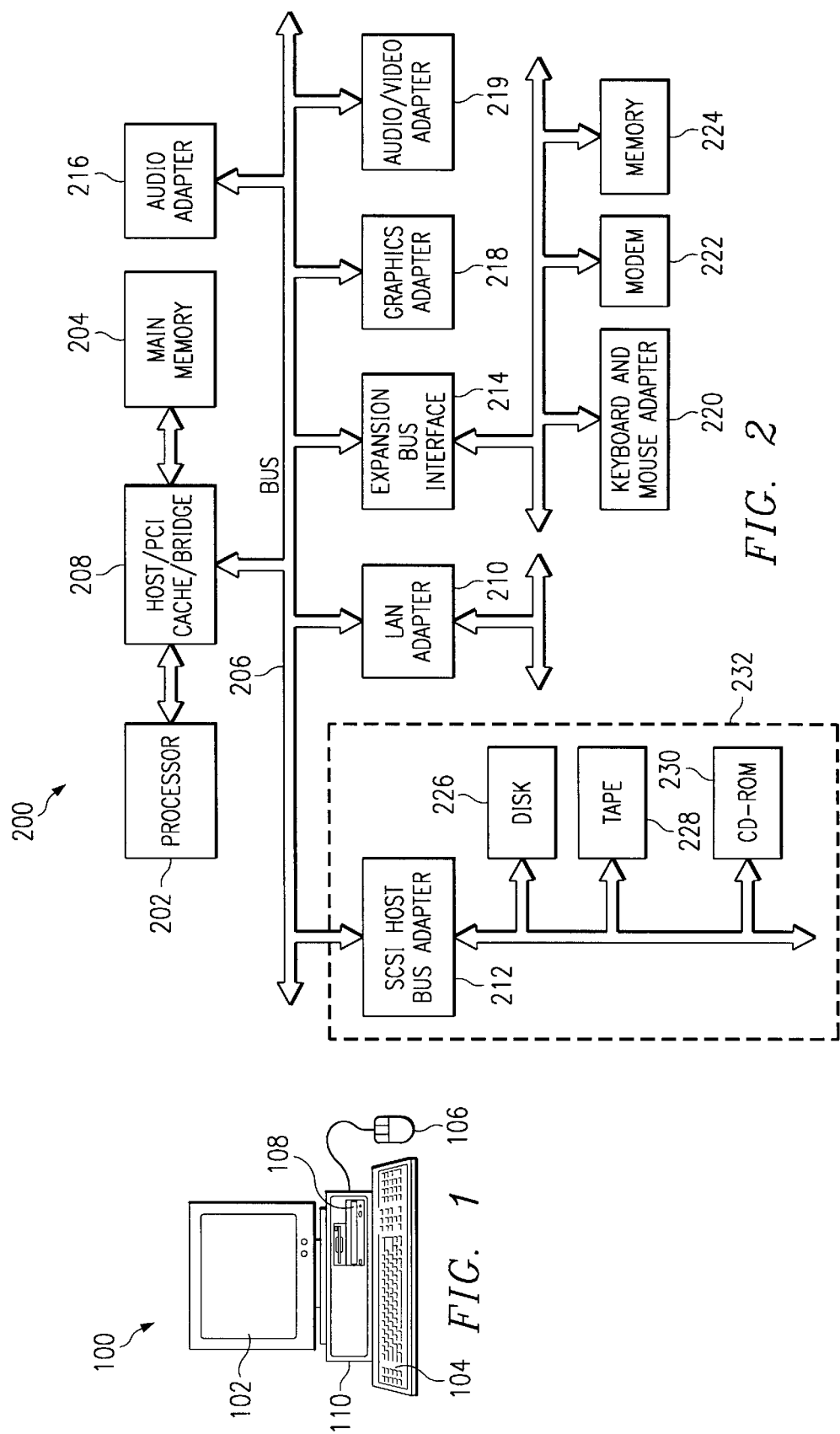

SYSTEM SOLUTION TO ALLOW 64-BIT PCI ADAPTERS TO DETERMINE STATE DURING RESET

BACKGROUND OF THE INVENTION

1. Technical Field

The present invention relates to an improved data processing system and, in particular, to an improved peripheral component interconnect (PCI) bus architecture. Still more particularly, the present invention provides a method and apparatus for allowing a 64-bit PCI adapter to determine whether it is in a 32-bit or 64-bit slot during reset.

2. Description of Related Art

According to the PCI specification, version 2.1, a 64-bit adapter can operate in either a 64-bit slot or a 32-bit slot. To determine the data width of the slot in which the adapter is located, the adapter samples the REQ64# signal. A signleline bus provides the REQ64# signal to adapters in 64-bit slots. When asserted by the system host bridge, the REQ64# signal indicates that the slot is a 64-bit slot. When asserted by an adapter located in a 64-bit slot, the REQ64# signal indicates that the adapter is operating at a 64-bit data width. As discussed below, problems arise during reset, when the REQ64# signal is not properly established. During reset, when the reset signal (RST#) is asserted, a 64-bit adapter must determine whether it is located in a 32-bit slot or a 64-bit slot. To determine the data width of the slot in which the adapter is located, the adapter samples the REQ64# signal at the end of reset, just prior to RST# being deasserted. The adapter may have no way of knowing if it is located in a 32-bit or 64-bit slot before the end of reset, because the REQ64# signal is not required to be in the proper state until ten clock cycles before the end of reset. This sequence is stated in the PCI 2.1 specification: "at the end of reset, the central resource controls the state of REQ64# to inform the 64-bit device that is connected to a 64-bit bus. If REQ64# is deasserted when RST# is deasserted, the device is not connected to a 64-bit bus. If REQ64# is asserted when RST# is deasserted, the device is connected to a 64-bit bus." See PCI 2.1 specification, section 3.10.

The PCI specification also states that when a 64-bit device is in a 32-bit slot, the "PCI component is responsible to insure that its inputs do not oscillate and that there is not a significant power drain through the input buffer. This can be done in a variety of ways: e.g., biasing the input buffer; or actively driving the outputs continually." See PCI 2.1 specification, section 4.2.1.1. This means that when a 64-bit adapter senses that it is in a 32-bit slot, it is responsible for not allowing the upper thirty-two bits to float. The floating pins would cause a power drain, which will result in the drivers being damaged in most cases depending on exposure time. However, the specification does not address the steps the 64-bit adapter should perform before it has a chance to determine the data width of the slot in which the adapter is installed. When the adapter is in a 32-bit slot and the adapter does not bias or drive its 64-bit extension pins bits, they will be floating during reset.

Some adapters attempt to remedy the above-mentioned problems by sampling REQ64# throughout reset. As a result, the adapter knows the data width of the slot in which it is located at the beginning of reset. However, one situation that may cause problems is when a 64-bit adapter is installed in a 64-bit slot. The 64-bit adapter could see the REQ64# signal deasserted at the beginning of reset, and the 64-bit adapter will drive its 64-bit extension pins as if it were in a 32-bit slot. However, the system host bridge is required to drive the bus during reset, so two devices would be driving the bus at the same time. The bus is referred to as being in contention if the adapter and the system host bridge are driving at different levels. Bus contention results in "crowbarring," which causes a large amount of current to flow through the bus, increasing the potential for device failure due to overcurrent component driver stress.

Hence, it would be advantageous to allow 64-bit PCI adapters to determine the type of slot in which it is installed from the beginning of reset.

SUMMARY OF THE INVENTION

The present invention solves the problems of the prior art by modifying the planar on systems that have a REQ64# signal to indicate 64-bit slots on a bus. The present invention causes the REQ64# signal to be asserted when the adapter is in reset on a 64-bit slot. This allows the adapter to see that it is in a 64-bit slot at the beginning of reset, preventing the adapter from driving the 64-bit extension pins.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a data processing system in which the present invention may be implemented;

FIG. 2 is a block diagram of a data processing system is shown in which the present invention may be implemented.

DETAILED DESCRIPTION OF THE PREFERRED EMBODIMENT

Figure 3:
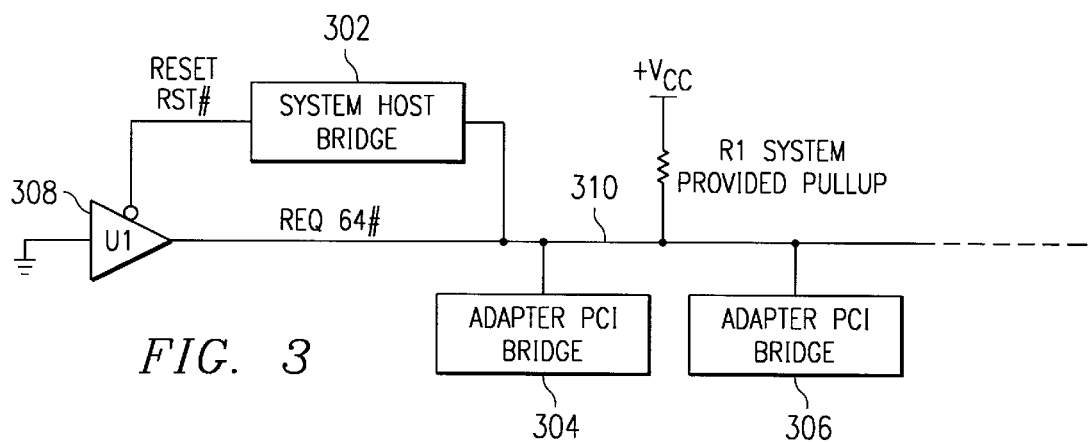
FIG. 3 is a diagram illustrating a modification to a data processing system in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joysitck, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer.

With reference now to FIG. 2, a block diagram of a data processing system is shown in which the present invention may be implemented. Data processing system 200 is an example of a computer, such as computer 100 in FIG. 1. Data processing system 200 employs a peripheral component interconnect (PCI) local bus architecture. The depicted example employs a PCI bus. Other bus architectures such as Accelerated Graphics Port (AGP) and Industry Standard Architecture (ISA) may also be present. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors per individual PCI bus.

An operating system runs on processor 202 and is used to coordinate and provide control of various components within data processing system 200 in FIG. 2. Instructions for the operating system and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the present invention may be applied to a multiprocessor data processing system. For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, mustinclude some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

Turning now to FIG. 3, a diagram is shown illustrating a modification to a data processing system in accordance with a preferred embodiment of the present invention. A system host bridge 302, such as Host/PCI cache bridge 208 in FIG. 2, supplies a REQ64# signal 310 to adapter PCI bridges 304, 306 for 64-bit slots. A single-line bus provides the REQ64# signal to adapters, such as any of adapters 210, 212, 216, 218, and 219 in FIG. 2, in 64-bit slots. When asserted by the system host bridge, the REQ64# signal indicates that the slot is a 64-bit slot. When asserted by an adapter located in a 64-bit slot, the REQ64# signal indicates that the adapter is operating at a 64-bit data width. System host bridge 302 is a bridge between the system bus and the PCI bus. Adapter PCI bridges 304, 306, also referred to as adapter bridges, are bridges between the PCI bus and the adapters' internal buses. According to a preferred embodiment of the present invention, a U1 module 308 is provided with the output connected to the REQ64# line. The U1 module is a tri-state buffer, such as part number 74F125 or other implementation. The input of U1 buffer 308 is connected to a low-level signal source. In a preferred embodiment of the present invention, the input of U1 buffer is connected to a logic low signal or ground. The output enable pin of U1 buffer 308 is connected to the RST# signal from the system host bridge.

When the enable pin of the U1 buffer is low, the output follows the input. When the enable pin of the U1 module is high, the output is tri-stated. In other words, the impedence between the output of the U1 buffer and ground is high; therefore, the U1 buffer does not inject or draw current.

Figure 4:
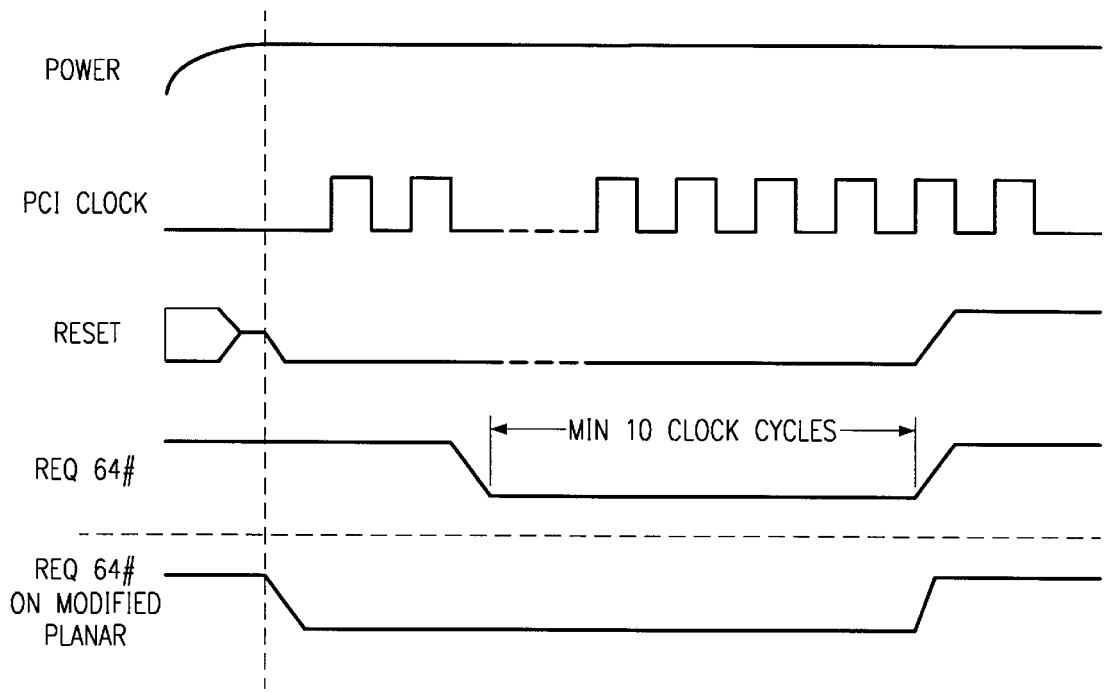
FIG. 4 is a timing diagram illustrating the operation of the present invention.

With reference now to FIG. 4, a timing diagram is shown illustrating the operation of the modified planar system according to a preferred embodiment of the present invention. When reset is asserted, enable is driven low, so the output follows the input, which is connected to a logic low signal or ground. In other words, REQ64# is driven low during reset and, thus, is asserted. When the system is not in reset, enable is driven high and the output, or REQ64#, is driven by the system host bridge or the adapter PCI bridges.

The above-described modification must be made to all the 64-bit slots on a system. The REQ64# signal will normally be pulled up if this signal is not being driven due to the connection to source ($V_{cc}$) through Resistor R1. The value of R1 shall be set such that REQ64# is driven by the system host bridge and the adapter PCI bridges when the tri-state buffer is tri-stated. When the reset signal is active, it will cause the output of U1 buffer, the REQ64# signal, to follow the input, which is ground or low. This will synchronize reset and REQ64#, eliminating the possibility for bus contention. No modification is necessary for 32-bit slots. This modification will not affect the normal operation of the bus, since it is only used during reset.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for allowing an adapter to determine data width, comprising:
   receiving a reset signal on a reset signal line from a system host bridge;
   synchronizinig a data width signal with the reset signal, wherein the data width signal on a data width signal line is asserted immediately in response to the reset signal being asserted;
   wherein the data width signal line is connected between the system host bridge and at least one adapter bridge located in at least one adapter slot; and
   wherein the data width signal, when asserted, indicates at the beginning of reset that the adapter slot is a 64-bit adapter slot.

2. The method of claim 1, wherein the step of asserting a data width signal in response to the reset signal being asserted is performed by a tristate buffer having an input connected to ground, an output connected to the data width signal line, and an enable pin connected to the reset signal line.

3. The method of claim 1, further comprising:

allowing the data width signal to be driven by the system host bridge or the at least one adapter bridge in response to the reset signal being deasserted.

4. A method in a data processing system for allowing an adapter to determine data width, comprising;

receiving a reset signal;

synchronizing a data width signal with the rest signal, wherein the data width signal is asserted immediately in response to the reset signal being asserted;

wherein the data width signal is asserted on a data width signal line connected between a system host bridge and at least one adapter bridge located in at least one adapter slot; and wherein the data width signal, when asserted, indicates at the beginning of reset that the adapter slot is a 64-bit adapter slot.

5. The method of claim 4, further comprising:

allowing the data width signal to be driven by a system host bridge or an adapter bridge in response to the reset signal being deasserted.

6. The method of claim 4, wherein the bus is a peripheral component interconnect bus.

7. An apparatus comprising;

a system host bridge providing a reset signal line for providing a reset signal, and a data width signal line for providing a data width signal;

at least one adapter bridge, located in at least one adapter slot, connected to the data width signal line; and a tri-state buffer having an input connected to ground, an output connected to the data width signal line, and an enable pin connected to the rest signal line;

wherein, when reset is asserted, the output of the tri-state buffer follows the input and the data width signal is asserted and, when reset is deasserted, the data width signal is driven by the system host bridge or the at least one adapter bridge;

said data width signal being synchronized with said reset signal, wherein said data width signal is asserted immediately in response to said reset signal being asserted; and wherein said data width signal, when asserted, indicates at the beginning of reset that said adapter slot is a 64-bit adapter slot.

8. The apparatus of claim 7, wherein the system host bridge and the at least one adapter bridge are connected to a bus.

9. The apparatus of claim 8, wherein the bus is a peripheral component interconnect bus.

10. An apparatus comprising;

a system host bridge providing a reset signal using a reset signal line and providing a data width signal using a data signal line;

at least one adapter bridge, located in at least one adapter slot, connected to the data width signal line;

a tri-state buffer having an input connected to a low-level signal source, an output connected to the data width signal line, and an enable pin connected to the reset signal line, said data width signal being synchronized with said reset signal, wherein said data width signal is asserted immediately in response to said reset signal being asserted; and wherein said data width signal, when asserted, indicates at the beginning of reset that said adapter slot is a 64-bit adapter slot.

11. The apparatus of claim 10, wherein the system host bridge and the at least one adapter bridge are connected to a bus.

12. The apparatus of claim 11, wherein the bus is a peripheral component interconnect bus.

13. An apparatus for allowing an adapter to determine data width, comprising;

means for receiving a reset signal;

means for asserting the data width signal in response to the reset signal being asserted;

said data width signal being synchronized with said reset signal, wherein said data width signal is asserted immediately in response to said reset signal being asserted;

wherein the data width signal is asserted on a data width signal line connected between a system host bridge and at least one adapter bridge located in at least one adapter slot; and wherein the data width signal, when asserted, indicates at the beginning of reset that the adapter slot is a 64-bit adapter slot.

14. The apparatus of claim 13, further comprising:

means for allowing the data width signal to be driven by a system host bridge or an adapter bridge in response to the reset signal being deasserted.

15. The apparatus of claim 13, wherein the bus is a peripheral component interconnect bus.

* * * * *

UNITED STATES PATENT AND TRADEMARK OFFICE
CERTIFICATE OF CORRECTION

PATENT NO. : 6,725,301 B1  
APPLICATION NO. : 09/606640  
DATED : April 20, 2004  
INVENTOR(S) : Gholami et al.

It is certified that error appears in the above-identified patent and that said Letters Patent is hereby corrected as shown below:

Col. 5, line 25: after "driven by" delete "a" and insert --the--.

Col. 5, line 26: after "or" delete "an" and insert --said--.

Col. 5, line 28: after "wherein" delete "the" and insert --a--.

Col. 6, line 45: before "system" delete "a" and insert --the--.

Col. 6, line 45: after "or" delete "an" and insert --said--.

Col. 6, line 47: after "wherein" delete "the" and insert --a--.

Signed and Sealed this

Eighteenth Day of July, 2006

JON W. DUDAS  
*Director of the United States Patent and Trademark Office*